(12) United States Patent
Rolleston et al.

(10) Patent No.: US 8,681,179 B2
(45) Date of Patent: Mar. 25, 2014

(54) METHOD AND SYSTEM FOR COORDINATING COLLISIONS BETWEEN AUGMENTED REALITY AND REAL REALITY

(75) Inventors: Robert John Rolleston, Rochester, NY (US); Jeffrey David Kingsley, Macedon, NY (US); Jia Wang, Worcester, MA (US)

(73) Assignee: Xerox Corporation, Norwalk, CT (US)

(*) Notice: Subject to any disclaimer, the term of this patent is extended or adjusted under 35 U.S.C. 154(b) by 259 days.

(21) Appl. No.: 13/331,458

(22) Filed: Dec. 20, 2011

(65) Prior Publication Data

US 2013/0155106 A1    Jun. 20, 2013

(51) Int. Cl.
*G09G 5/00*    (2006.01)

(52) U.S. Cl.
USPC ............................................. 345/633

(58) Field of Classification Search
USPC .......................................... 345/633
See application file for complete search history.

(56) References Cited

U.S. PATENT DOCUMENTS

| | | | |
|---|---|---|---|
| 6,175,343 B1 | 1/2001 | Mitchell et al. | |
| 7,576,725 B2 | 8/2009 | Bathiche et al. | |
| 8,547,401 B2 * | 10/2013 | Mallinson et al. | 345/633 |
| 2004/0090460 A1 * | 5/2004 | Kawahara | 345/764 |
| 2005/0285878 A1 * | 12/2005 | Singh et al. | 345/633 |
| 2008/0147325 A1 | 6/2008 | Maassel et al. | |
| 2009/0066641 A1 | 3/2009 | Mahajan et al. | |
| 2009/0088243 A1 | 4/2009 | Gagner et al. | |
| 2011/0018903 A1 | 1/2011 | Lapstun et al. | |
| 2012/0056898 A1 * | 3/2012 | Tsurumi et al. | 345/633 |
| 2012/0069051 A1 * | 3/2012 | Hagbi et al. | 345/633 |
| 2012/0075285 A1 * | 3/2012 | Oyagi et al. | 345/419 |

OTHER PUBLICATIONS

Changhun Chae, Introduction of Physics Simulation in Augmented Reality, 2008, ISUVR '08 Proceedings of the 2008 International Symposium on Ubiquitous Virtual Reality, pp. 37-40.*

* cited by examiner

*Primary Examiner* — Aaron M Richer
*Assistant Examiner* — Mohammad H Akhavannik
(74) *Attorney, Agent, or Firm* — Kermit D. Lopez; Luis M. Ortiz; Ortiz & Lopez, PLLC (57) ABSTRACT

A method and system for coordinating placement of an augmented reality/virtual world object(s) into a scene relative to position and orientation. The object(s) can be connected to an anchor point having an absolute location relative to the marker via a connector (e.g., spring-like connector) in such a way that the behavior of the object responds to a physical force and a collision which exists in the augmented reality scene. The connection between the virtual object and location of the marker permits the object to exactly track the marker when there are no real world collisions between the markers. The virtual objects can be displaced so the objects do not pass through one another when the real world markers come into a close spatial proximity and the corresponding virtual objects begin to collide.

11 Claims, 10 Drawing Sheets

METHOD AND SYSTEM FOR COORDINATING COLLISIONS BETWEEN AUGMENTED REALITY AND REAL REALITY

TECHNICAL FIELD

Embodiments are generally related to AR (Augmented Reality). Embodiments are also related to the interaction between augmented reality and real reality. Embodiments are additionally related to coordinating collisions between augmented reality and real reality.

BACKGROUND OF THE INVENTION

AR (Augmented Reality) is a term for a live direct or indirect view of a physical, real-world environment whose elements are augmented by a computer-generated sensory input such as, for example, sound, video, graphics or GPS (Global Positioning System) data. Augmented reality is generally related to mediated reality, in which a view of reality is modified (possibly even diminished rather than augmented) by a computer. As a result, the technology functions by enhancing one's current perception of reality. By contrast, virtual reality (VR) replaces the real world with a simulated one. Augmented reality is considered as an extension of virtual reality. Virtual reality is a virtual space where the player immerses himself into that exceed the bounds of physical reality. In the virtual reality, time, physical laws, and material properties no longer hold in contrast to the real-world environment.

Figure 1:
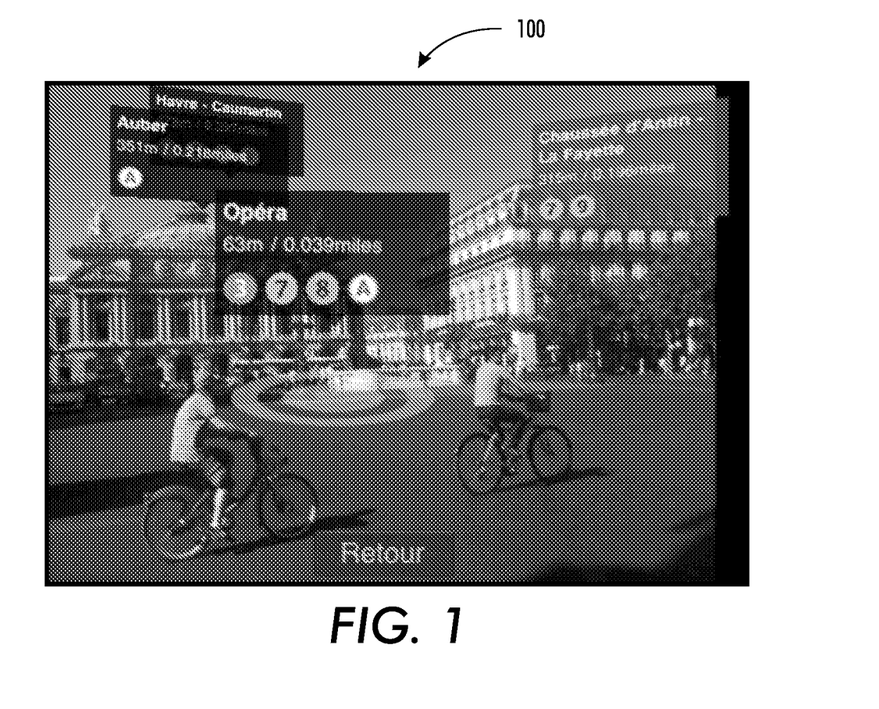
FIG. 1 illustrates an exemplary augmented reality system using geo-spatial information from a mobile communication device to overlay and/or augment a scene with other information regarding the area.
Figure 2:
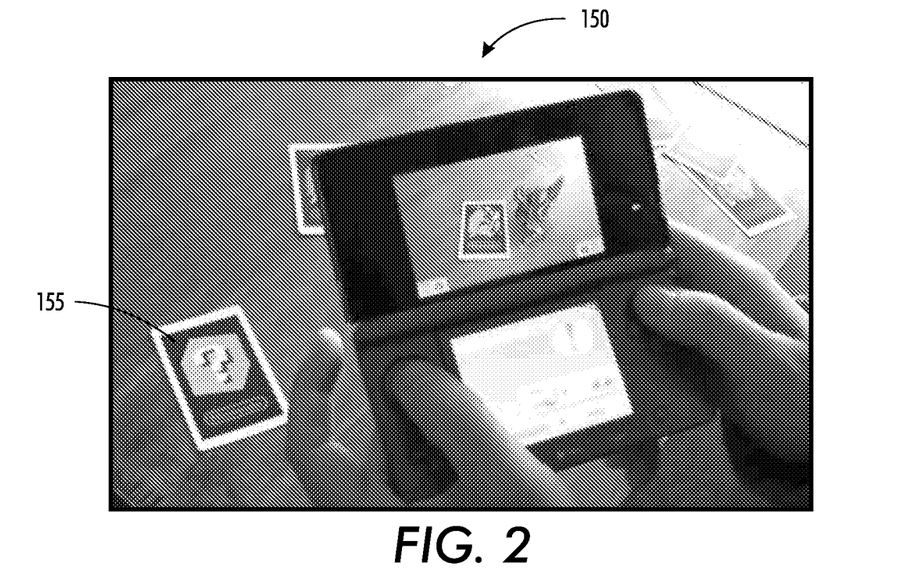
FIG. 2 illustrates an exemplary augmented reality system using a token/marker to place a virtual object on top of a real world video stream.

Augmented reality can be utilized in applications such as, for example, gaming, education, medicine, manufacturing, and marketing. FIG. 1 illustrates an exemplary augmented reality system 100 utilizing geo-spatial information from a mobile communication device to overlay and/or augment a scene with other information regarding the area. Augmented reality also employs a token and/or a marker to place a virtual object on top of a real world video stream. The augmented reality system recognizes and tracks the position and orientation of the registered marker and a computer generated (CG) object is overlaid onto a real world (RW) image to create an augmented reality scene. FIG. 2 illustrates an exemplary augmented reality system 150 utilizing the token and/or marker 155 to place the virtual object on top of the real world video stream. One of the problems associated with such prior art system 150 is that the virtual reality object is not the same size and shape as the augmented reality marker or token 155.

Figure 3:
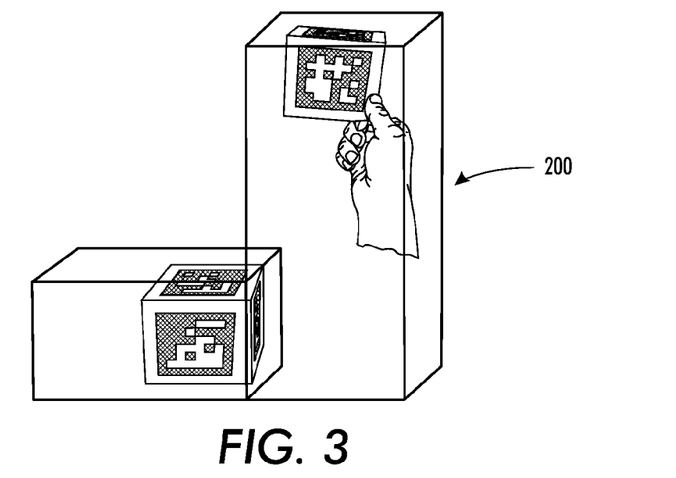
FIGS. 3-5 illustrate a 3D representation of the augmented reality objects.
Figure 4:
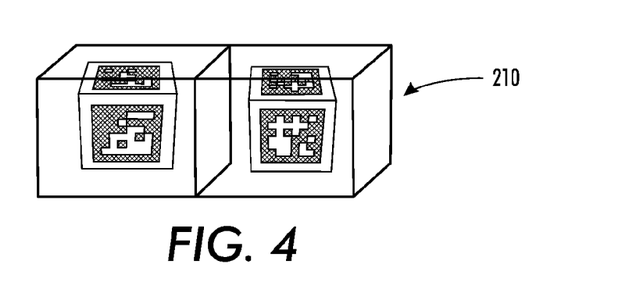
Figure 5:
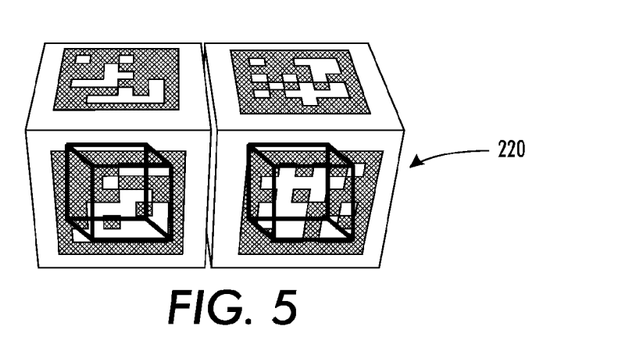

FIGS. 3-5 illustrate a 3D representation 200, 210, and 220 of the augmented reality rendered objects and the real world tokens. The augmented reality system employs six augmented reality markers attached to six faces of a cube to manipulate the objects in a 3D virtual environment. For example, in FIGS. 3-4 one of the augmented reality/virtual world objects is wider than the marker cube and the objects are colliding, but the markers are not in contact and can thus continue to move closer. In FIG. 5, the objects are not in contact, but the markers are in direct contact and can move no closer together. Hence a mismatch between actions in the real world environment and the placement of the virtual object in the augmented environment takes place.

Based on the foregoing, it is believed that a need exists for an improved system and method for coordinating placement of an augmented reality object(s) into a scene relative to the position and orientation of a marker. A need also exists for an improved method for configuring a connector between the virtual object in the augmented environment and location of the marker viewed in a real world image, as will be described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved augmented reality system and method.

It is another aspect of the disclosed embodiments to provide for an improved system and method for coordinating placement of an augmented reality object(s) into a scene relative to position and orientation of a marker.

It is a further aspect of the disclosed embodiments to provide for an improved method for configuring a connector between the virtual object in an augmented environment and location of the marker viewed in a real world image.

The aforementioned aspects and other objectives and advantages can now be achieved as described herein. A method and system for coordinating placement of an augmented reality/virtual world object(s) into a scene relative to position and orientation of a marker is disclosed herein. The object(s) can be connected to an anchor point having an absolute location relative to the marker via a connector (e.g., spring-like connector) in such a way that the behavior of the object can respond to a physical force and collision which exist in the augmented reality scene. The connection between the virtual object and location of the marker permits the object to exactly track the marker when there are no real world collisions between the markers. The virtual objects can be displaced so the objects do not pass through one another when the real world markers come into a close spatial proximity and the corresponding virtual objects begin to collide. The object can track the marker in a loosely coupled fashion thereby permitting a smoother and more intuitive connection between the motion of the marker and the object.

An image capturing unit captures a real-world image and the virtual objects can be placed on top of the real world images utilizing the markers and displayed on an image display unit. A central small box can be placed at the location of the marker and the object can be attached to the central point by a set of springs. The object can respond to the collision and kinetic forces exerted by other objects. The object can be kept in proximity to the marker location; but does not possess a rigid and fixed location or orientation relative to the marker location. The object can be rendered around the real world marker (the black box at the center) and can be attached by the set of invisible virtual springs to the non-augmented reality object which matches the marker. The object can sit with the marker hidden in the center when there are no collisions in the augmented reality environment. The collisions can result in an offset of the centroids of the real world marker and the augmented reality rendered objects. The location of the object can be permitted to obey the physics of collisions with other objects and the attachment to the marker location via the springs.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g. through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 6:
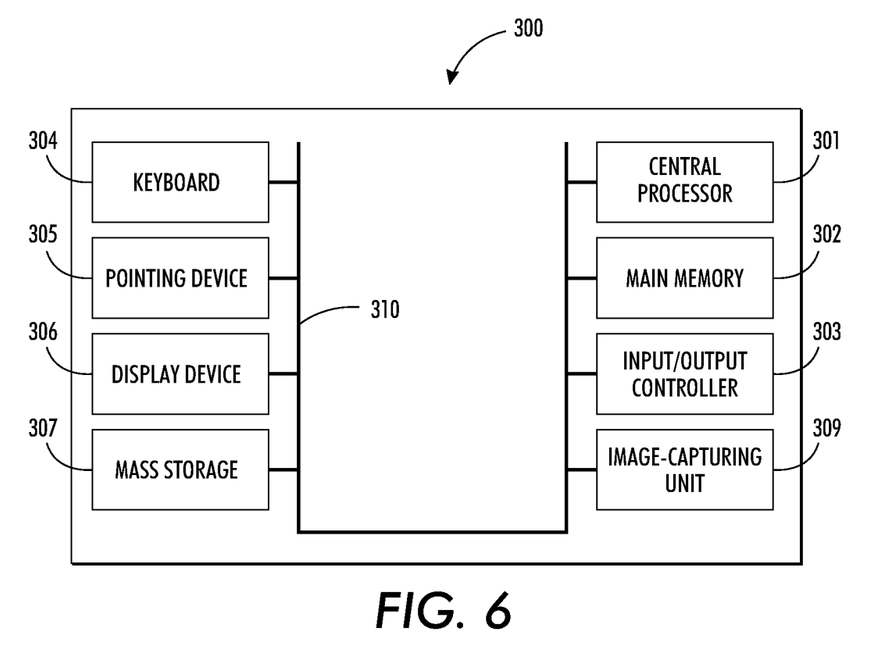
FIG. 6 illustrates a schematic view of a data-processing system, in which disclosed embodiments may be implemented.
Figure 7:
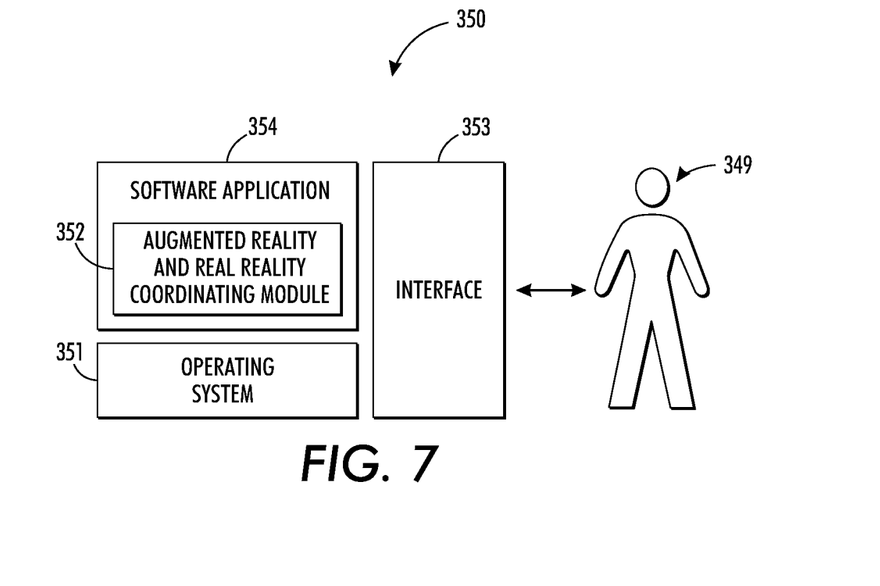
FIG. 7 illustrates a schematic view of a software system including an augmented reality and real reality coordinating module, an operating system, and a user interface, in accordance with the disclosed embodiments.

FIGS. 6-7 are provided as exemplary diagrams of data-processing environments in which embodiments of the present invention may be implemented. It should be appreciated that FIGS. 6-7 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 6, the disclosed embodiments may be implemented in the context of a data-processing system 300 that includes, for example, a central processor 301, a main memory 302, an input/output controller 303, a keyboard 304, an input device 305 (e.g., a pointing device such as a mouse, track ball, and pen device, etc.), a display device 306, and a mass storage 307 (e.g., a hard disk). System 300 can also include, for example, an image-capturing unit 309 such as a camera, etc. As illustrated, the various components of data-processing system 300 can communicate electronically through a system bus 310 or similar architecture. The system bus 310 may be, for example, a subsystem that transfers data between, for example, computer components within data-processing system 300 or to and from other data-processing devices, components, computers, etc.

FIG. 7 illustrates a computer software system 350 for directing the operation of the data-processing system 300 depicted in FIG. 6. Software application 354, stored in main memory 302 and on mass storage 307, generally includes a kernel or operating system 351 and a shell or interface 353. One or more application programs, such as software application 354, may be "loaded" (i.e., transferred from mass storage 307 into the main memory 302) for execution by the data-processing system 300. The data-processing system 300 receives user commands and data through user interface 353; these inputs may then be acted upon by the data-processing system 300 in accordance with instructions from operating system module 351 and/or software application 354.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 353, which is preferably a graphical user interface (GUI), also serves to display results, whereupon the user may supply additional inputs or terminate the session. In an embodiment, operating system 351 and interface 353 can be implemented in the context of a "Windows" system. It can be appreciated, of course, that other types of systems are possible. For example, rather than a traditional "Windows" system, other operation systems such as, for example, Linux may also be employed with respect to operating system 351 and interface 353. The software application 354 can include an augmented reality and real reality coordinate module 352 for coordinating placement of an augmented reality/virtual world object(s) into a scene relative to position and orientation of a marker. Software application 354, on the other hand, can include instructions such as the various operations described herein with respect to the various components and modules described herein such as, for example, the method 600 depicted in FIG. 10.

FIGS. 6-7 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, UNIX, LINUX, and the like.

Figure 8:
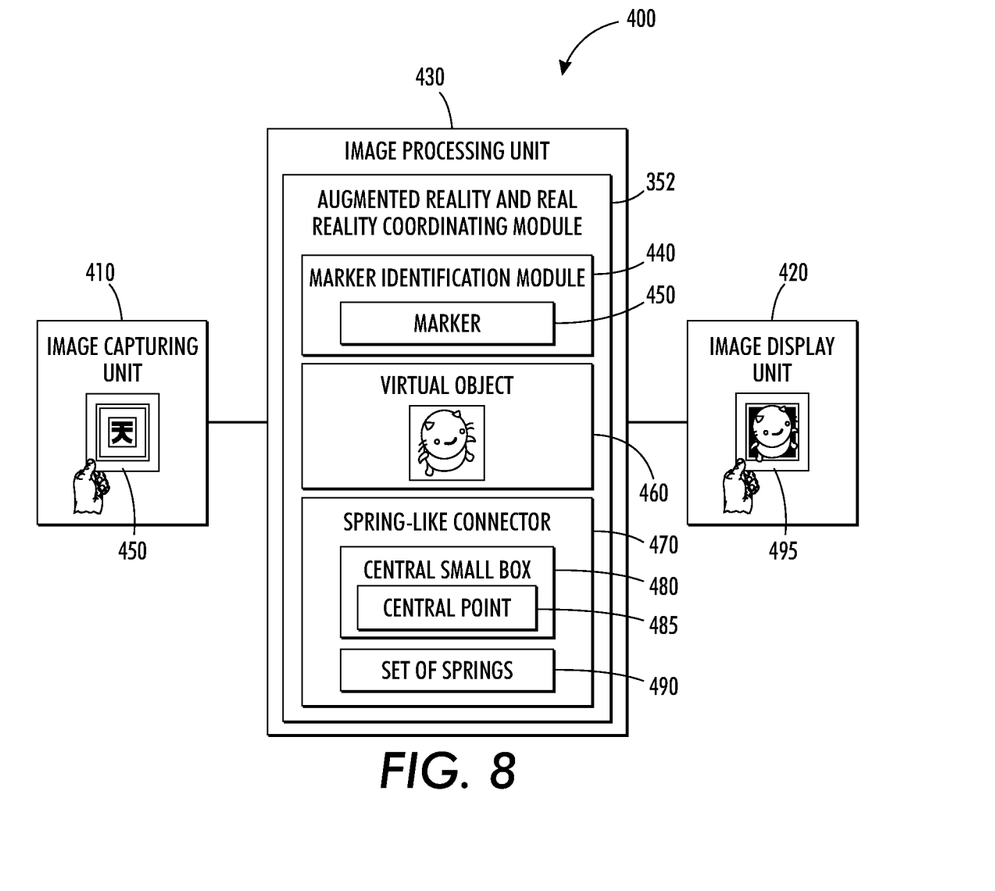
FIG. 8 illustrates a block diagram of an augmented reality system for coordinating placement of an augmented reality/virtual world object(s) into a scene relative to position and orientation of a marker, in accordance with the disclosed embodiments.

FIG. 8 illustrates a block diagram of an augmented reality system 400 for coordinating placement of an augmented reality/virtual world object 460 into a scene relative to position and orientation of a marker 450, in accordance with the disclosed embodiments. Note that in FIGS. 6-15, identical parts or elements are generally indicated by identical reference numerals. In general, augmented reality is a technique for overlaying virtual objects onto the real world. The augmented reality can be applied to a large number of entertainment applications by using vision based tracking technique.

The augmented reality system 400 can be configured to include an image capturing unit 410, an image processing unit 430, and an image display unit 420. The image capturing unit 410 captures a real-world image and the augmented reality and real reality coordinating module 352 place one or more virtual object(s) 460 on top of a real world images using a marker 450. The image display unit 420 displays the augmented reality rendered image 495 generated by the augmented reality and real reality coordinating module 352. The term "virtual object" generally refers to a geometric representation of an object and the image capturing unit 410 may include one or more digital cameras (not shown) for capturing a real-world image of the real-world scene. The marker is a two-dimensional image identifying virtual reality data information and uses random pattern in general.

The augmented reality and real reality coordinating module 352 further includes a marker identification module 440 and a spring-like connector 470. Note that the use of a "spring" as discussed herein is used for exemplary purposes only. That is, it can be appreciated that other shapes, sizes, etc., can be equally utilized in the context of the disclosed embodiments, and the discussion of a "spring" and "spring connector" or "spring-like connector" or "springs" in no way limits the scope of the disclosed embodiments and the claimed invention.

In the example discussed herein, the spring connector 470 can connect the object 460 to an anchor point 485 having an absolute location relative to the marker 450 in such a way that the behavior of the object 460 can respond to a physical force and collision which exists in an augmented reality scene. Note that the spring connector 470 is described for purposes of clarity and specificity; however, they should not be interpreted in any limiting way. However, it will be apparent to those skilled in the art that other connectors and shapes can be utilized as desired without departing from the scope of the invention.

A central small box 480 can be placed at the location of the marker 450 and the object 460 can be attached to the central point 485 by a set of springs 490. Note that the object 460 can be kept in proximity to the marker location 450, but no longer has a rigid and fixed location or orientation relative to the marker location. The spring-like connection 470 between the virtual object 460 and location of the marker 450 permits the object 460 to exactly track the marker 450 when there are no real world collisions between the markers 450. The spring connector 470 displaces the virtual objects 460 so that the objects 460 do not pass through one another when the real world markers 450 come into a dose spatial proximity, and the corresponding virtual objects 460 begin to collide. The object(s) 460 can track the marker(s) 450 in a loosely coupled fashion thereby permitting a smoother and more intuitive connection between the motion of the markers 450 and the objects 460.

Figure 9:
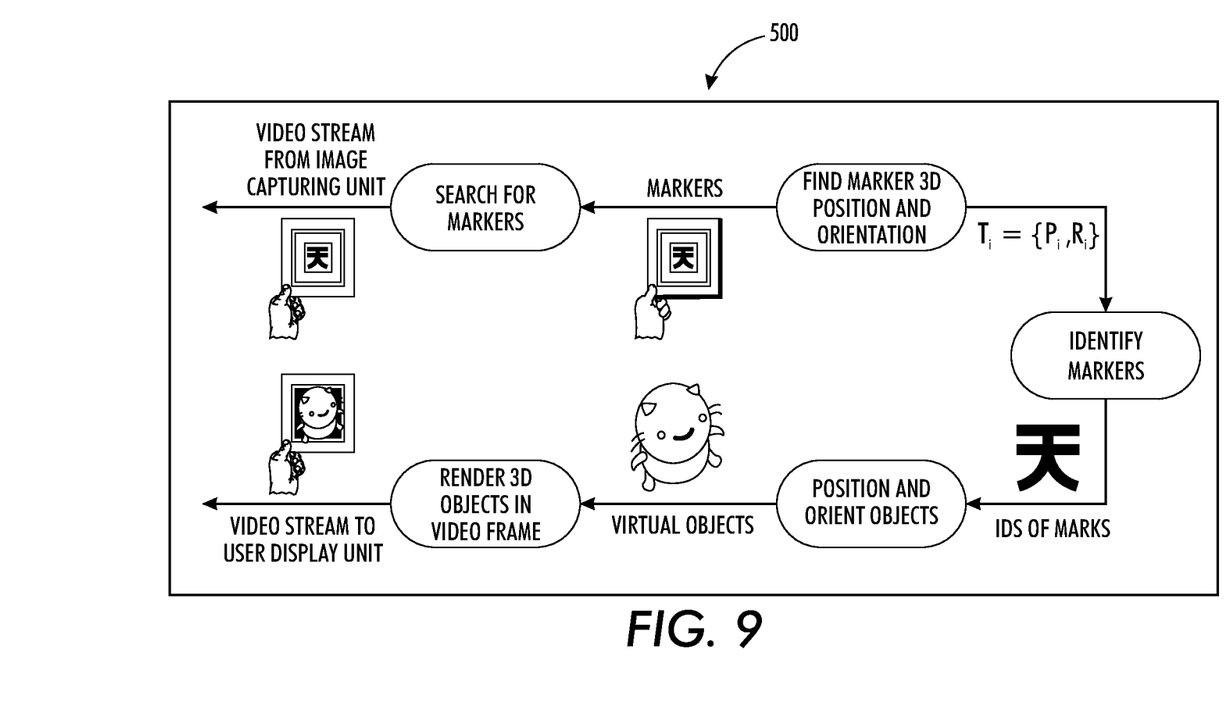
FIG. 9 illustrates a flow diagram of a marker-based augmented reality system, in accordance with the disclosed embodiments.

FIG. 9 illustrates a flow diagram 500 of the marker-based augmented reality system 400, in accordance with the disclosed embodiments. Initially, a video stream captured from, for example, the image-capturing unit 309 shown in FIG. 6, can be converted to a binary image and a black marker frame can be identified. The 3D position and orientation of the markers 450 relative to the image-capturing unit 410 can be calculated. Thereafter, matching the symbol inside the marker 450 with templates stored in the memory can identify the markers 450. The 3D virtual objects 460 can be aligned with the markers 450 utilizing T$_i$ transform. The virtual objects can be rendered in the video frame.

Figure 10:
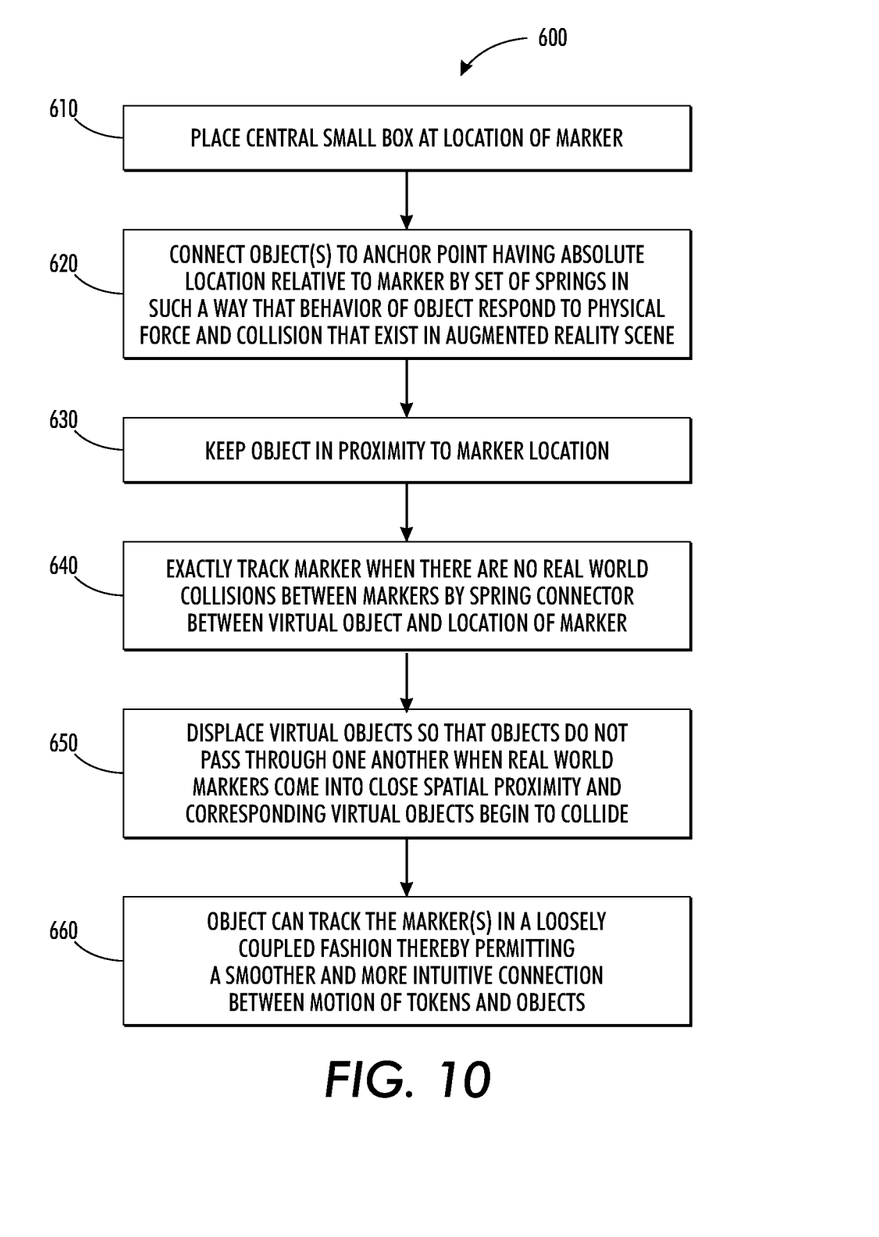
FIG. 10 illustrates a high level flow chart of operations illustrating logical operational steps of a method for coordinating placement of the object into the scene relative to position and orientation of the marker, in accordance with the disclosed embodiments.

FIG. 10 illustrates a high level flow chart of operations illustrating logical operational steps of a method 600 for coordinating placement of the augmented reality/virtual world object 460 into the scene relative to position and orientation of the marker 450, in accordance with the disclosed embodiments. Initially, the central small box 480 can be placed at the location of the marker 450, as indicated at block 610. The object 460 can be connected to the anchor point 485 having an absolute location relative to the marker 450 by a set of springs 490 in such a way that the behavior of the object 460 can respond to a physical force and collision which exists in an augmented reality scene, as shown at block 620. The object 460 can be kept in proximity to the marker location 450, but no longer has a rigid and fixed location or orientation relative to the marker location, as illustrated at block 630.

Thereafter, as shown at block 640, the spring connection 490 between the virtual object 460 and location of the marker 450 permits the object 460 to exactly track the marker 450 when there are no real world collisions between the markers 450. The virtual objects 460 can be displaced so that the objects 460 do not pass through one another when the real world markers come into a dose spatial proximity, and the corresponding virtual objects 460 begin to collide, as illustrated at block 650. The object(s) 460 can track the marker(s) 450 in a loosely coupled fashion thereby permitting a smoother and more intuitive connection between the motion of the markers 450 and the objects 460, as indicated at block 660.

Figure 11:
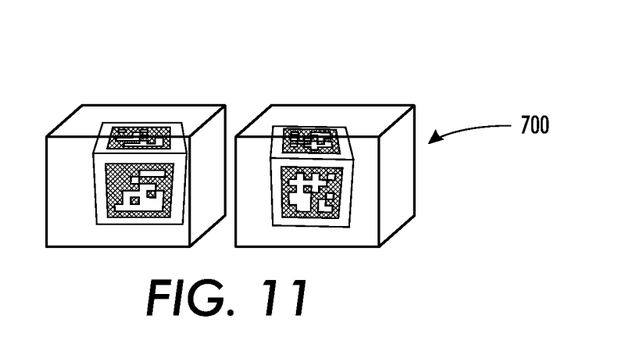
FIGS. 11-13 illustrate a 3D representation of the augmented reality/virtual world rendered objects during collisions in the scene, in accordance with the disclosed embodiments.
Figure 12:
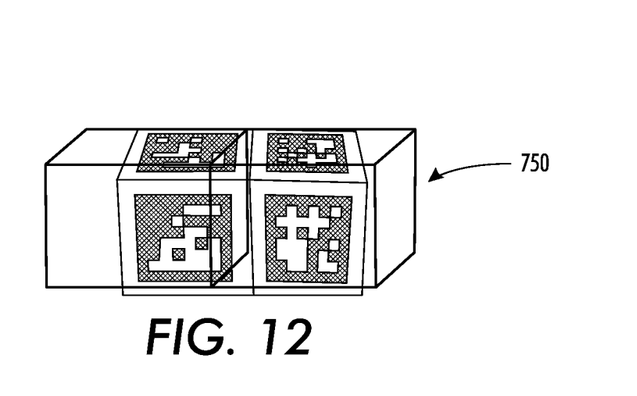
Figure 13:
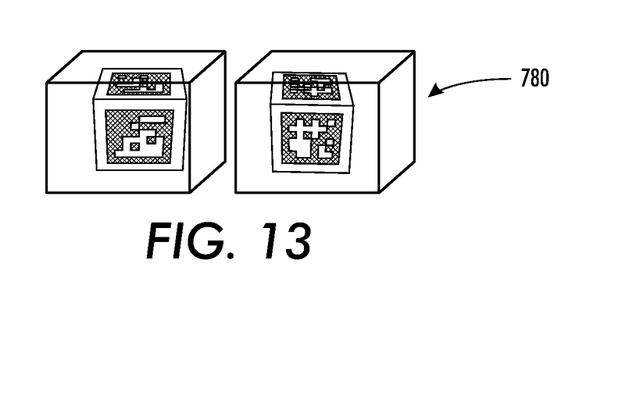

FIGS. 11-13 illustrate a 3D representation of the AR/VW (Augmented Reality/Virtual World) rendered objects during collisions in the AR/VW scene, in accordance with the disclosed embodiments. FIG. 11 illustrates a 3D representation 700 of the AR/VW rendered objects with no collisions. The centers of the AR/VW rendered objects align with the center of the marker cube. FIG. 12 illustrates a 3D representation 750 of the AR/VW rendered objects with collisions. The spring connector 470 permits the centers of the AR/VW rendered objects to shift with respect to the center of the marker cube. FIG. 13 illustrates a 3D representation 780 of the AR/VW rendered objects with the real world markers moved apart and are no longer colliding. The spring connector 470 permits the centers of the AR/VW rendered objects to return to alignment with the center of the marker cube.

Figure 14:
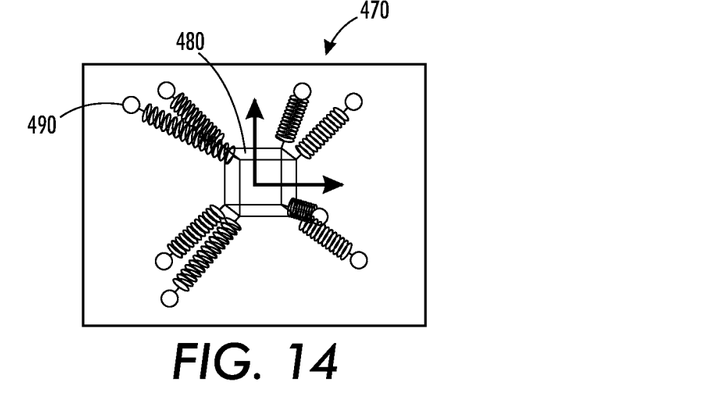
FIG. 14 illustrates a structural view of a spring-like connector, in accordance with the disclosed embodiments.

The actions shown in FIGS. 11-13 are accomplished by the spring connector 470 shown in FIG. 14. FIG. 14 illustrates a structural view of the spring connector 470, in accordance with the disclosed embodiments. The central small black box 480 can be placed at the location of the marker 450. The AR/VW object 460 can be attached to the central point 485 by the set of springs 490. Note that in the AR/VW rendering, neither the central box 480, nor the springs 490 can be rendered, but are kept invisible. With this connection, the AR/VW object 460 can be kept in proximity to the location of the marker 450, but no longer has a rigid and fixed location or orientation relative to the marker/token location.

The object 460 can respond to the collision and kinetic forces exerted by other objects. The object 460 can be rendered around the real world marker 450 (the black box at the center) and is attached by the set of invisible virtual springs 490 to the non-augmented reality object 460 which matches the marker 450. The object 460 can sit with the marker 450 hidden in the center when there are no collisions in the AR/VW environment. The collisions can result in an offset of the centroids of the real world marker 450 and the AR/VW rendered objects 495.

Figure 15:
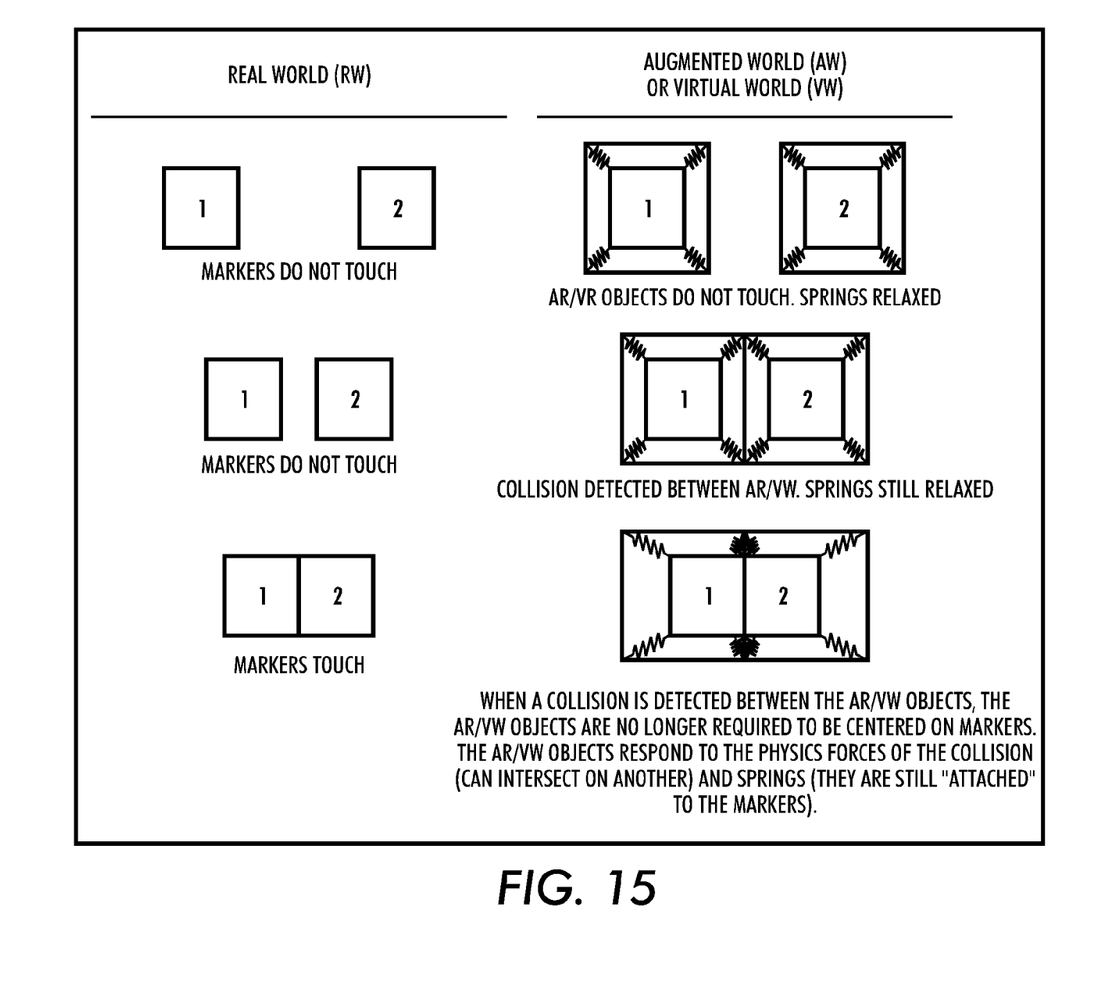
FIG. 15 illustrates a 2D representation of connection between location of the marker and placement of the objects in the scene, in accordance with the disclosed embodiments.

FIG. 15 illustrates a 2D representation of a connection between location of the marker 450 in the real world and placement of the AR/VW objects 460 in the AR/VW scene. The mismatch in the size or shape of the marker 450 and the AR/VW rendered objects 495 can be reconciled when there are collisions among the AR/VW objects 460. Note that the simple cubes and eight corner springs are described for purposes of clarity and specificity; however, they should not be interpreted in any limiting manner. However, it will be apparent to those skilled in the art that other shapes and spring configurations can be utilized as desired without departing from the scope of the invention. The location of the AR/WV object 460 can be permitted to obey the physics of collisions with other AR/VW objects and the attachment to the marker 450 location via the springs 490.

Based on the foregoing, it can be appreciated that a number of embodiments, preferred and alternative, are disclosed herein. For example, in one embodiment, a method can be provided for coordinating an augmented reality and a real reality. Such a method can include, for example, steps of connecting an object to an anchor point having an absolute location relative to a marker via a connector in such a manner that a behavior of the object responds to a physical force and a collision that exists in an augmented reality scene; tracking the marker by the object via the connector between the object and the marker location if a real world collision between the marker does not exist; and displacing the object so that the object does not pass through a corresponding object when the marker comes into a dose spatial proximity and the corresponding object begins to collide, thereby permitting a smoother and intuitive connection between a motion of the marker and the object.

In another method embodiment, the connector can be, for example, a spring-like connector. In yet another method embodiment, steps can be provided for placing a central small box at the marker location and attaching the object to the central point by a set of invisible virtual springs. In still another method embodiment, steps can be provided for capturing a real-world image by an image-capturing unit and placing the object on top of the real world image using the marker, and displaying an augmented reality rendered image on an image display unit. In other method embodiments, a step can be provided for responding to the collision and a kinetic force exerted by other objects by the object wherein the object is kept in proximity to the marker location. In still other method embodiments, a step can be provided for rendering the object around the marker and attaching the marker by the set of invisible virtual springs to a non-augmented reality object, which matches the marker. Additionally, in other method embodiments, the aforementioned object can sit with the marker hidden in a center thereof when there are no collisions in the augmented reality environment. In yet other method embodiments, the collisions can result in an offset of centroids of the marker and the augmented reality rendered object.

In other embodiments, a system can be implemented for coordinating an augmented reality and a real reality. Such a system can comprise, for example, a processor and a data bus coupled to the processor. Such a system can also include a computer-usable medium embodying computer code, the computer-usable medium being coupled to the data bus. The computer program code can comprise instructions executable by the processor and configured for: connecting an object to an anchor point having an absolute location relative to a marker via a connector in such a manner that a behavior of the object responds to a physical force and a collision that exists in an augmented reality scene; tracking the marker by the object via the connector between the object and the marker location if a real world collision between the marker does not exist; and displacing the object so that the object does not pass through a corresponding object when the marker comes into a close spatial proximity and the corresponding object begins to collide, thereby permitting a smoother and intuitive connection between a motion of the marker and the object.

In other system embodiments, the aforementioned connector can be a spring-like connector. In yet other system embodiments, the instructions can be further configured for placing a central small box at the marker location and attaching the object to the central point by a set of invisible virtual springs. In still other system embodiments, the instructions can be further configured for capturing a real-world image by an image-capturing unit and placing the object on top of the real world image using the marker, and displaying an augmented reality rendered image on an image display unit. In still other system embodiments, the instructions can be further configured for responding to the collision and a kinetic force exerted by other objects by the object wherein the object is kept in proximity to the marker location.

In still other system embodiments, such instructions can be further configured for rendering the object around the marker and attaching the marker by the set of invisible virtual springs to a non-augmented reality object, which matches the marker. In yet other system embodiments, the aforementioned object can sit with the marker hidden in a center thereof when there are no collisions in the augmented reality environment. In other system embodiments, the collision can result in an offset of centroids of the marker and the augmented reality rendered object.

In another embodiment, a processor-readable medium can be implemented, which stores code representing instructions to cause a process to perform a process to coordinate an augmented reality and a real reality. Such code can include code to, for example, connect an object to an anchor point having an absolute location relative to a marker via a connector in such a manner that a behavior of the object responds to a physical force and a collision that exists in an augmented reality scene; track the marker by the object via the connector between the object and the marker location if a real world collision between the marker does not exist; and displace the object so that the object does not pass through a corresponding object when the marker comes into a close spatial proximity and the corresponding object begins to collide, thereby permitting a smoother and intuitive connection between a motion of the marker and the object.

In another processor-readable media embodiment, the aforementioned connector can be a spring-like connector. In still other processor-readable media embodiments, the code can further comprise code to, for example, place a central small box at the marker location and attach the object to the central point by a set of invisible virtual springs. In yet another processor-readable media embodiment, the code can comprise code to capture a real-world image by an image-capturing unit and placing the object on top of the real world image using the marker, and displaying an augmented reality rendered image on an image display unit. In yet other processor-readable media embodiments, the code can comprise code to respond to the collision and a kinetic force exerted by other objects by the object wherein the object is kept in proximity to the marker location. In another processor-readable media embodiment, the code can comprise code to render the object around the marker and attaching the marker by the set of invisible virtual springs to a non-augmented reality object, which matches the marker. In yet another processor-readable media embodiment, the aforementioned object can sit with the marker hidden in a center thereof when there are no collisions in the augmented reality environment. In another processor-readable media embodiment, the collisions result in an offset of centroids of the marker and the augmented reality rendered object.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A method for coordinating an augmented reality and a real reality, said method comprising:
connecting an object to an anchor point having an absolute location relative to a marker via a spring connector in such a manner that a behavior of said object responds to a physical force and a collision that exists in an augmented reality scene;
tracking said marker by said object via said spring connector between said object and a location of said marker if a real world collision between said marker does not exist;
displacing said object so that said object does not pass through a corresponding object when said marker comes into a close spatial proximity and said corresponding object begins to collide;

placing a central small box at a location of said marker;
attaching said object to a center of said central small box by a set of invisible virtual springs;
capturing a real-world image by an image capturing unit and placing said object on top of said real world image using said marker; and
displaying an augmented reality rendered image on an image display unit, thereby permitting a smoother and intuitive connection between a motion of said marker and said object.

2. The method of claim 1 further comprising responding to said collision and a kinetic force exerted by other objects by said object wherein said object is kept in proximity to said location of said marker.

3. The method of claim 1 further comprising rendering said object around said marker and attaching said marker by said set of invisible virtual springs to a non-augmented reality object which matches said marker.

4. The method of claim 1 wherein said object sits with said marker hidden in a center thereof when there are no collisions in said augmented reality environment.

5. The method of claim 1 wherein said collisions result in an offset of centroids of said marker and said augmented reality rendered object.

6. A system for coordinating an augmented reality and a real reality, said system comprising:
a processor;
a data bus coupled to said processor; and
a non-transitory computer-usable medium embodying computer code, said computer-usable medium being coupled to said data bus, said computer program code comprising instructions executable by said processor and configured for:
connecting an object to an anchor point having an absolute location relative to a marker via a spring connector in such a manner that a behavior of said object responds to a physical force and a collision that exists in an augmented reality scene;
tracking said marker by said object via said spring connector between said object and a location of said marker if a real world collision between said marker does not exist;
displacing said object so that said object does not pass through a corresponding object when said marker comes into a close spatial proximity and said corresponding object begins to collide;
placing a central small box at said location of said marker;
attaching said object to a center of said central small box by a set of invisible virtual springs;
capturing a real-world image by an image capturing unit and placing said object on top of said real world image using said marker; and
displaying an augmented reality rendered image on an image display unit, thereby permitting a smoother and intuitive connection between a motion of said marker and said object.

7. The system of claim 6 wherein said instructions are further configured for responding to said collision and a kinetic force exerted by other objects by said object wherein said object is kept in proximity to said location of said marker.

8. The system of claim 6 wherein said instructions are further configured for rendering said object around said marker and attaching said marker by said set of invisible virtual springs to a non-augmented reality object which matches said marker.

9. The system of claim 6 wherein said object sits with said marker hidden in a center thereof when there are no collisions in said augmented reality environment.

10. The system of claim 6 wherein said collision results in an offset of centroids of said marker and said augmented reality rendered object.

11. A non-transitory processor-readable medium storing code representing instructions to cause a process to perform a process to coordinate an augmented reality and a real reality, said code comprising code to:
connect an object to an anchor point having an absolute location relative to a marker via a spring connector in such a manner that a behavior of said object responds to a physical force and a collision that exists in an augmented reality scene;
track said marker by said object via said spring connector between said object and a location of said marker if a real world collision between said marker does not exist;
displace said object so that said object does not pass through a corresponding object when said marker comes into a dose spatial proximity and said corresponding object begins to collide;
place a central small box at said location of said marker;
attach said object to a center of said central small box by a set of invisible virtual springs
capture a real-world image by an image capturing unit and placing said object on top of said real world image using said marker; and
display an augmented reality rendered image on an image display unit, thereby permitting a smoother and intuitive connection between a motion of said marker and said object.

* * * * *